C. A. JUENGST.

MACHINE FOR SAWING METAL.

APPLICATION FILED JUNE 9, 1908.

Reissued Aug. 10, 1909. 13,004.

Witnesses
Chas. A. Smith
A. H. Ferrell

Inventor
Charles A. Juengst.
by Harold Ferrell
his atty

UNITED STATES PATENT OFFICE.

CHARLES A. JUENGST, OF CROTON FALLS, NEW YORK, ASSIGNOR TO HIGLEY MACHINE PANY, OF CROTON FALLS, NEW YORK, A CORPORATION OF NEW YORK.

MACHINE FOR SAWING METAL

No. 13,004. Specification of Reissued Letters Patent. Reissued Aug. 10, 1909.

Original No. 870,180, dated November 5, 1907, Serial No. 249,177. Application for reissue filed June 9, 1908. Serial No. 437,603.

*To all whom it may concern:*

Be it known that I, CHARLES A. JUENGST, a citizen of the United States, residing at Croton Falls, in the county of Westchester and State of New York, have invented an Improvement in Machines for Sawing Metal, of which the following is a specification.

My invention relates to the class of metal sawing machines in which the saw frame with the saw are raised to the work and an after feed maintained for progressively advancing the saw through the work and the saw and frame thereafter returned to an initial position.

My invention is an improvement upon and addition to the devices shown and described in Letters Patent No. 864,424, granted to me August 27, 1907. In this class of metal sawing machines the gravity return of the saw and saw frame to an initial position has usually been more rapid and the arrested movement more sudden than was desirable, and this was liable, because of the weight of the parts to cause injury thereto.

The object of my invention is to reduce to a minimum the liability to injury by effecting a slow return.

In carrying out my invention I provide devices which run freely with the rotary feed movement for the saw and saw frame, which run continuously while the machine is in operation and always with the same direction of movement, and co-acting devices brought into evidence upon the release of the feed engaging devices at the end of the cut, and which co-acting devices are in direct connection with part of the feeding mechanism to receive the downward thrust of the moving saw frame and saw and gradually lower the same to an initial position.

Figure 1:
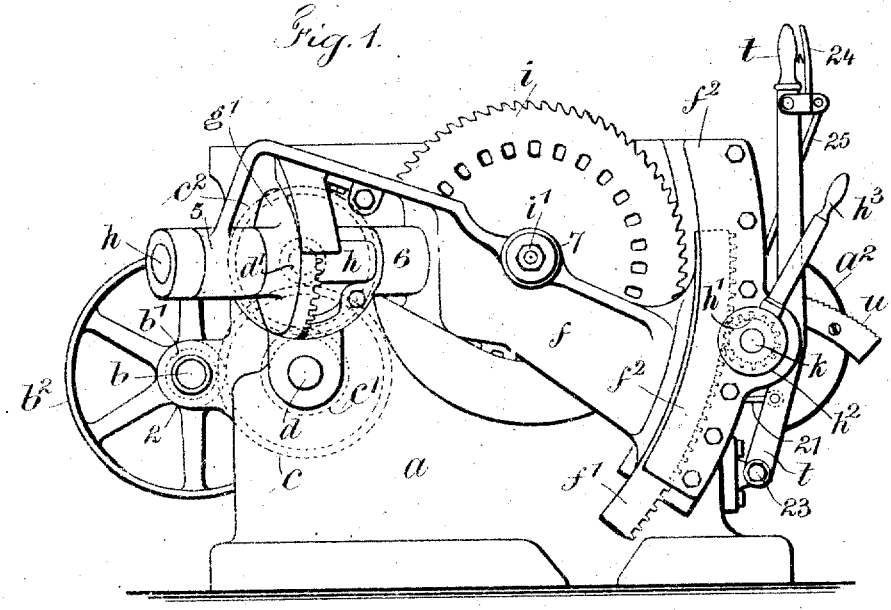
Figure 2:
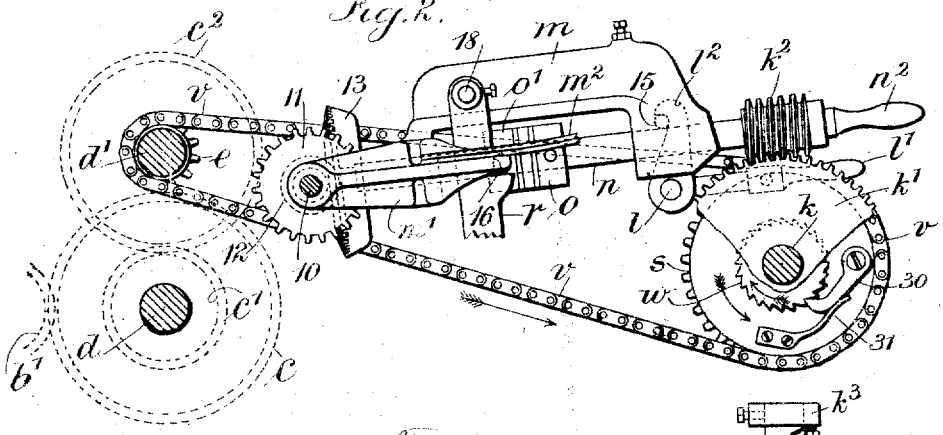
Figure 3:
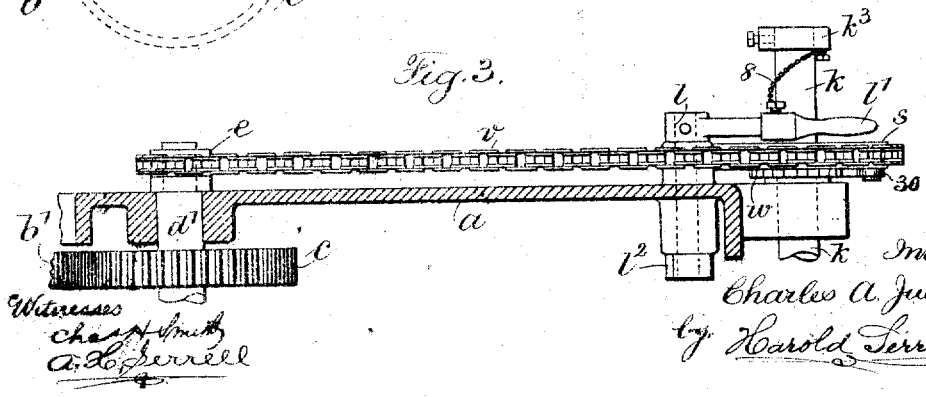

In the drawing, Figure 1 is a side elevation showing the saw frame and saw and part of the feeding devices. Fig. 2 is a vertical central section and elevation longitudinally of the frame and parts of the machine showing the features of my improvement, and Fig. 3 is a plan and partial horizontal section of the devices shown in Fig. 2 and particularly of those that come outside of the frame. Figs. 2 and 3 are in larger size for clearness.

The devices shown and described in my aforesaid patent, and which, for the purpose of an operative structure are shown herein comprise the following:

The frame $a$ of the machine comprises sides, ends and a top or bed. At one end of this frame there are bearings 2 for the power shaft $b$. On the power shaft $b$ is a pinion $b^1$ and adjacent to the end of this shaft there is a pulley $b^2$; a gear $c$ is in mesh with the pinion $b^1$ and the same is secured upon the shaft $d$ which passes across through the machine in suitable bearings provided therefor. On this shaft $d$ is a gear $c^1$ in mesh with the gear $c^2$ on a shaft $d^1$ located above the shaft $d$ in a plane parallel therewith and also in suitable bearings in the frame of the machine. The saw frame $f$ is suitably mounted to swing upon the shaft $d^1$.

$g^1$ is a bevel wheel on a shaft $h$ through which the power and rotation of the shaft $d^1$ are communicated to the saw, the shaft being provided with bearings 5, 6 in the saw frame, the saw $i$ being mounted upon an arbor $i^1$ in a bearing 7 of the saw frame. The edge of the saw frame $f$ distant from its connection with the shaft $d^1$ is provided with a toothed segment $f^1$ covered and protected by a casing $f^2$ secured to the frame of the machine, and a shaft $k$ passes through suitable bearings of the frame of the machine in the end opposite to the portion containing the shafts $d$ $d^1$. Upon the shaft $k$ there is a pinion $k^1$ in mesh with the toothed segment $f^1$ of the saw frame and a hub $k^2$ on the outer end, which hub is provided with a handle $k^3$ by which the said shaft $k$ may be rotated with the pinion $k^1$ so as to raise the saw and saw frame up to the work. On the shaft $k$ there is also a worm-wheel $k^4$ and a hub $k^5$ on the opposite end, to which hub is connected one end of the chain 8.

In a bearing in the frame of the machine there is a short shaft $l$ on the outer end of which is a handle $l^1$ to which is secured the other end of the chain 8, while on the inner end of the shaft $l$ there is a hook device $l^2$. A bridge frame comprises a central longitudinal portion $m$ and yoke end $m^1$. This is preferably an integral structure, the central portion having bearings for a shaft $n$ and the yoke end having bearings for a short shaft 10, the respective ends of which shaft are in bearings in the machine frame. In connection with this bridge frame I employ a spring $m^2$ at one end secured to the yoke portion of the frame and at the other end adapted to bear upon a bracket of the machine frame as shown in my aforesaid patent, said spring and bracket normally supporting the bridge frame in an elevated position.

On the short shaft 10 there is a gear 11 meshing with the gear $c^2$, the movement being communicated from the gear 11 to the bevel-wheel 13 by a bevel pinion 12 as shown in the aforesaid patent. This bevel wheel 13 is on one end of the shaft $n$, while on the opposite end of said shaft there is a worm $k^2$ adapted when the shaft $n$ is depressed by a handle $n^2$ to mesh with the worm wheel $k^1$ upon the shaft $k$, the handle $n^2$ being at one end of the shaft $n$. The sleeves $o$ $o^1$, yoke-frame $r$, its pin 18, the trunnions or pins 16, rod 21, pivot 23, grip device 24 and rod 25, a segment rack $u$, lever $t$ and the gear case $a^2$ parts shown and described in the aforesaid patent and herein shown in the drawing in whole or in part, have the same function as similar parts in the aforesaid patent and do not require further description.

The essential parts of my present invention comprise a sprocket $e$ on the shaft $d^1$, a larger sprocket $s$ on the shaft $k$, a chain $v$ passing around the sprockets $e$ $s$ and communicating power and movement from the shaft $d^1$ and sprocket $e$ to the sprocket $s$, the sprocket $e$ being fast upon the shaft $d^1$, and the sprocket $s$ loose upon the shaft $k$. Fast upon the shaft $k$ is a ratchet $w$ and secured to the face of the sprocket $s$ adjacent to the ratchet $w$ is a pawl 30 engaging said ratchet and held in such engagement by the spring 31, which spring is also secured to the face of the sprocket.

In the operation of the device the hand of the operator may first engage the handle $h^3$ and turn the shaft $k$ and the pinion $h^1$ thereon to raise the toothed segment $f^1$, the saw frame and saw up to the work, after which the operator moves down the bridge frame by the handle $n^2$ and connects the same with the hook device $l^2$ simultaneously coupling the worm $k^2$ and the worm wheel $k^1$ so as to communicate the power of the shaft $n$ through the worm $k^2$ and worm wheel $k^1$ to the shaft $k$, pinion $h^1$ and toothed segment $f^1$ to continue the rising movement of the saw frame and saw as the saw progresses through the work. This is the preferable mode of procedure and the most expeditious as it saves time in getting the saw up to the work and in operative position in view of the fact that the feed of the saw is necessarily slow through the work and its rate of approach no faster. I do not however limit myself in this particular because the operator may prefer at the outset to move down the bridge frame by the handle $n^2$ and connect the same with the hook device $l^2$ simultaneously coupling the worm $k^2$ and worm wheel $k^1$ etc. just as hereinbefore described so as to start and continue the rising movement of the saw frame and saw and progress the same through the work. The former is economical of machine time and the latter economical of the machinist's time. During this movement of feeding the saw through the work the sprockets $e$, $s$ and chain $v$ have been continuously running and at a speed in excess of the speed of rotation of the shaft $k$, consequently the pawl 30 has been running free around the ratchet $w$, because of the fact that the sprocket $s$ is loose upon the shaft $k$. As soon as the saw has passed through the work the same and the saw frame are to be returned to an initial position, and to effect this movement the hub $k^3$, which has been previously set according to the thickness of the work operated upon, acts with the rotation of the shaft $k$ during the cutting operation upon the chain 8 to wind said chain about the free end of the shaft $k$ and when drawn taut to pull down the handle $l^1$ connected to the chain and in so doing to disconnect the hook $l^2$ from engagement with the pin 15. This permits the spring $m^2$ to come in evidence and raise the bridge frame $m$ and shaft $n$ and disconnect the worm $k^2$ from the worm-wheel $k^1$ thus stopping the further progress of the feeding movement, and at the same time releasing the saw and saw frame, so that its weight comes into evidence and is effective to return the same to its initial position. The moment that this weight comes into evidence the same tends to set up a movement of the toothed-segment $f^1$ and pinion $h^1$ in the opposite direction; this opposite direction if unchecked or unhindered at once causes the ratchet $w$ and pawl 30 to lock, and the shaft $k$ through the ratchet $w$ and pawl 30 to be connected to the sprocket $s$, chain $v$ and sprocket $e$ back to the shaft $d^1$, thus supporting the weight of the saw and saw frame and lowering the same progressively and no faster than the movement of the said sprockets and chain will permit so that the saw and frame gradually return to an initial position instead of suddenly returning by a gravity action alone. The devices for effecting this gradual return instead of the gravity return, are few in number and exceedingly simple, and they may be applied to the machine of my aforesaid patent or to other similar machines for effecting the same function.

I claim as my invention:

1. In a metal-sawing machine, the combination with a gravity moving saw frame and saw and the saw feed engaging, operating and releasing devices, of devices which upon the release of the feeding and operating devices automatically come into engagement with and hold the gravity moving saw and saw frame and gradually return the same to an initial position.

2. In a metal sawing machine, the combination with a gravity moving saw frame and saw, a shaft, a pinion and a toothed-segment, and means for turning the said shaft to raise the saw frame and the saw to and progress the same through the work, of devices which upon the release of the feeding devices automatically come into engagement with the said shaft and hold the gravity moving saw and saw frame and gradually return the same to an initial position.

3. In a metal sawing machine, the combination with a gravity moving saw frame and saw, a shaft, a pinion and a toothed-segment, and means for turning the said shaft to raise the saw frame and the saw to and progress the same through the work, of devices associated with the said shaft and with a power shaft of the machine normally running free but brought into evidence upon the release of the feed and operating devices to automatically come into engagement with and hold the gravity moving saw frame and saw and gradually return the same to an initial position.

4. In a metal sawing machine, the combination with a gravity moving saw frame and saw, a segmental gear on the saw frame, a shaft, a toothed wheel on said shaft meshing with the segmental gear, devices for rotating said shaft and toothed wheel and feeding said saw to and through the work, means connected to and associated with part of the previous devices and regulatable in proportion to the predetermined length of the cut to be performed by the saw, and which means act at the end of the cut to effect a separation of the feed actuating devices so that the saw may be returned to an initial position.

5. In a metal sawing machine, the combination with a saw and a saw arm pivoted near one end for an up and down swinging movement of the saw and a toothed segment on the opposite end of a shaft, a gear thereon meshing with the segment, a device positioned according to the predetermined length of the cut to be performed by the saw and which device acts at the end of the cut to effect a separation of the feed actuating devices so that the saw may be returned to an initial position.

6. In a metal sawing machine, the combination with a gravity moving saw frame and saw, a segmental gear on the saw frame, a gear meshing therewith, a shaft for said gear, a source of power and devices operatively connecting the same with said shaft for effecting the feed of the saw, means associated with part of said feeding devices and regulatable in proportion to the predetermined length of the cut to be performed by the saw and which means act at the end of the cut to effect a separation of the feed actuating devices, and means which are thereafter brought into operation to turn said shaft and its gear in the opposite direction actuating the segmental gear in a downward direction to return said saw and saw frame to an initial position.

7. In a metal sawing machine, the combination with a saw and saw arm pivoted near one end for an up and down swinging movement of the saw, and a feed device on the other end of the saw arm, of revoluble feed actuating devices engaging with said feed device of the saw arm for supporting said saw arm and saw at one end during both the up and down movement of the same, means for actuating said devices for feeding said saw to and through the work, means for arresting this feed movement at the end of the cut performed and means providing for the return of the saw to an initial position.

8. In a metal sawing machine, the combination with a saw and saw arm pivoted near one end for an up and down swinging movement of the saw, and a feed device on the other end of the saw arm, of revoluble feed actuating devices engaging with said feed device of the saw arm for supporting said arm and saw at one end during both the up and down movement of the same, a series of devices actuating the aforesaid devices for feeding said saw to and through the work, means for arresting this feed movement at the end of the cut performed by the saw, and another series of devices providing for the return thereafter of the saw to an initial position.

9. In a metal sawing machine, the combination with a saw and saw arm pivoted near one end for an up and down swinging movement of the saw, and a toothed segment on the other end of the saw arm and other side of the saw from the pivot, of revoluble feed actuating devices engaging with said feed device of the saw arm for supporting said saw arm and saw at one end during both the up and down movement of the same, means for actuating said devices for feeding said saw to and through the work, means for arresting this feed movement at the end of the cut performed and means providing for the return of the saw to an initial position.

10. In a metal sawing machine, the combination with a gravity moving saw frame and saw, a shaft, a pinion and a toothed-segment, and means for turning the said shaft to raise the saw frame and the saw to and progress the same through the work, of a sprocket loose upon said shaft, a sprocket upon a power shaft of the machine, a chain passing around and connecting the two sprockets and shafts, a ratchet fast upon the aforesaid shaft, a spring controlled pawl fast upon the loose sprocket and engaging the teeth of the fast ratchet, said parts being adapted for engagement upon the release of the feeding and operating devices so as to automatically engage and hold the gravity moving saw frame and saw and permit the same to return to an initial position at a speed controlled by the movement of said sprockets and chain.

11. In a metal sawing machine, the combination with the pivotally mounted saw frame and saw, a toothed segment on said saw frame, a revoluble shaft, a pinion thereon meshing with the toothed segment, a toothed wheel also on said shaft, and means for engaging said toothed wheel to rotate the same and said shaft and progressively feed the saw through the work, and means for disengaging the aforesaid feeding devices at the end of the cut, of devices coacting with said shaft and with a power shaft of the machine and acting upon the release of the feeding devices to engage and hold the said revoluble shaft, pinion, segmental gear and the saw frame and saw and permit the saw frame and saw to return gradually to an initial position.

12. In a metal sawing machine, the combination with the pivotally mounted saw farme and saw, a toothed segment on said saw frame, a revoluble shaft, a pinion thereon meshing with the toothed-segment, a toothed-wheel also on said shaft, and means for engaging said toothed wheel to rotate the same and said shaft and progressively feed the saw through the work, and means for disengaging the aforesaid means at the end of the cut, of a ratchet fast upon said shaft, a sprocket loose upon said shaft, a pawl on the face of said sprocket adjacent to and engaging the teeth of the ratchet, a spring for holding the pawl in engagement with the ratchet, a sprocket on a power or prime-mover shaft of the machine, and a chain passing around the sprockets, said sprockets and chain running free with the machine in the advancing movement of the saw and frame, and acting upon the reverse movement of the saw frame and saw and upon the release of the feeding devices to bring the pawl and ratchet into engagement and support the saw frame and saw by the said shaft and permit the same to gradually return to an initial position with the rotation of said shaft.

13. In a metal sawing machine, the combination with a gravity moving saw frame and saw, a shaft, a pinion and toothed segment and means for turning said shaft in one direction to raise the saw frame and the saw to and progress the same through the work, of devices connecting said shaft with a power shaft of the machine and which devices are adapted to rotate in a direction the opposite to the first aforesaid shaft, devices for releasing the feeding and operating devices and other devices automatically engaging upon the release of the feeding and operating devices to hold the gravity moving saw frame and saw and permit the same to return to an initial position.

14. In a metal sawing machine, the combination with a gravity moving saw frame and saw, and the saw feed engaging operating and releasing devices, of devices connecting the latter devices with a power shaft of the machine and which devices are adapted to rotate in a direction the opposite to the second aforesaid devices, and other devices automatically engaging upon the release of the feeding and operating devices to hold the gravity moving saw frame and saw and permit the same to return to an initial position.

Signed by me this second day of June 1908.

CHAS. A. JUENGST.

Witnesses:
GEO. T. PINCKNEY,
E. ZACHARIASEN.